United States Patent [19]

Suzuki et al.

[11] Patent Number: 5,032,937
[45] Date of Patent: Jul. 16, 1991

[54] MAGNETIC TAPE RECORDING AND/OR REPRODUCING APPARATUS HAVING AUTOMATIC MODE CHANGING CAPABILITIES

[75] Inventors: Yutaka Suzuki; Masaharu Hayakawa; Takehiko Yonekawa, all of Nagaokakyo, Japan

[73] Assignee: Mitsubishi Denki Kabushiki Kaisha, Tokyo, Japan

[21] Appl. No.: 381,257

[22] Filed: Jul. 18, 1989

[30] Foreign Application Priority Data

Jul. 22, 1988 [JP] Japan ................................ 63-184032

[51] Int. Cl.$^5$ .............................................. G11B 15/46
[52] U.S. Cl. .................................. 360/73.06; 360/72.3
[58] Field of Search .................... 360/73.06, 73.08, 72.3

[56] References Cited

U.S. PATENT DOCUMENTS

| 3,691,314 | 9/1972 | De Bell et al. | 360/73.08 |
| 3,834,648 | 9/1974 | Rose, Jr. et al. | 360/73.06 |
| 4,267,564 | 5/1981 | Flores | 360/73.06 |
| 4,338,640 | 7/1982 | Yabu et al. | 360/73.06 |
| 4,358,798 | 11/1982 | Hedlund et al. | 360/73.08 |
| 4,478,376 | 10/1984 | Sakaguchi et al. | 360/73.06 |
| 4,550,349 | 10/1985 | Okoyama et al. | 360/73.06 |
| 4,882,640 | 11/1989 | Wakui | 360/73.08 |

FOREIGN PATENT DOCUMENTS

55-34514 9/1980 Japan .

Primary Examiner—A. J. Heinz
Assistant Examiner—Jefferson Evans

[57] ABSTRACT

A magnetic tape player which includes a tape transport speed selector capable of assuming one of first and second modes during which the magnetic recording tape is transported at a first transport speed and a second transport speed which is 1/n (n being an integer other than 1) of the first transport speed, respectively, a remaining tape length measuring means for measuring a length of time available for recording information to an end of the magnetic recording tape when the magnetic recording tape is transported at the first transport speed, a recording timer for outputting a remaining time signal indicative of the balance between a preset recording time and the length of time actually passed in recording and for outputting a terminating signal necessary to terminate the transport of the magnetic recording tape when the balance becomes zero, and a comparator for comparing the available recording time signal and the remaining time signal with a conversion value during information recording with the magnetic recording tape transported at the second transport speed. If the available recording time signal is higher than the remaining time, the magnetic recording tape is transported at the first transport speed, but if the available recording time signal is lower than the remaining time, the magnetic recording tape is transported at the second transport speed.

19 Claims, 3 Drawing Sheets

MAGNETIC TAPE RECORDING AND/OR REPRODUCING APPARATUS HAVING AUTOMATIC MODE CHANGING CAPABILITIES

BACKGROUND OF THE INVENTION

1. Field of the Invention

The present invention relates to a magnetic tape recording and/or reproducing apparatus such as, for example, a video tape recorder, operable with a tape cassette having supply and take-up reels and a length of magnetic recording tape secured at its opposite ends to the supply and take-up reels, respectively.

More specifically, the present invention relates to a magnetic tape recording and/or reproducing apparatus, hereinafter referred to as a magnetic tape player, of a type capable of indicating to an operator of the magnetic tape player whether or not a cassette tape loaded into the magnetic tape player has a sufficient length of magnetic recording tape to completely record thereon the entire length of that particular information, such as for example, a televised program, the operator wishes to record.

2. Description of the Background Art

A magnetic tape player having a capability of indicating the length of magnetic recording tape remaining on the supply reel or the remaining tape length is well known in the art and currently available in the market. Generally, the length of magnetic recording tape remaining on the supply reel and available for information recording or reproduction (playback) is indicated by means of a tape counter in terms of the length of time left until an approach to the end-of-tape is detected. Even though the magnetic tape player has the capability of indicating the remaining tape length, it has often been observed that the user or operator of the magnetic tape player is annoyed if the cassette tape loaded into the magnetic tape player does not have a sufficient length of magnetic recording tape required to completely record thereon the entire length of a particular televised program the operator wishes to record.

In any event, reference will be made to FIGS. 3 and 4 of the accompanying drawings for the detailed discussion of the prior art magnetic tape player believed to be closest to the present invention.

Figures 3, 4:
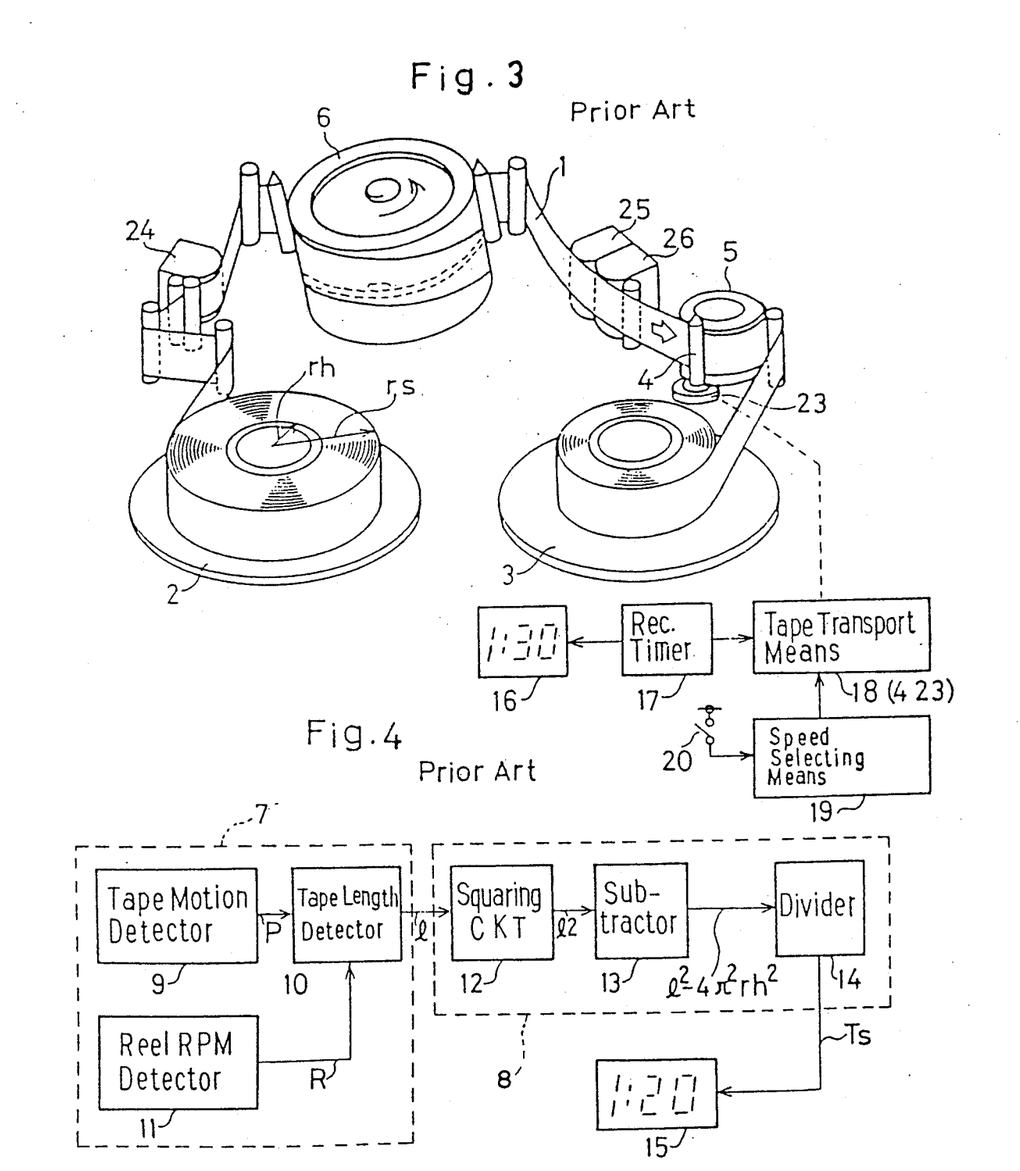
FIG. 3 is a schematic diagram illustrating both the prior art magnetic tape player in schematic perspective representation and the tape transport speed selecting mechanism used in the prior art magnetic tape player.
FIG. 4 is a circuit block diagram showing the prior art system used in the magnetic tape player of FIG. 3 for calculating the length of magnetic recording tape remaining on the supply reel and the remaining tape hour.

FIG. 3 illustrates both the magnetic tape player in schematic perspective representation and a circuit block diagram showing a tape transport speed selector mechanism used in the magnetic tape player. A length of magnetic recording tape is generally indicated by 1 having one end secured to a supply reel 2 to form a supply tape pack and the opposite end secured to a take-up reel 3 to form a recorded tape pack. A portion of the magnetic recording tape 1 generally intermediate between the supply and recorded tape packs on the supply and take-up reels 2 and 3 is, with respect to the direction of tape transport from the supply reel 2 towards the take-up reel 3, passed in front of an eraser head 24, then turned a predetermined angle around a rotary drum assembly 6 so as to be scanned by one or more magnetic transducing heads, passed in front of an audio eraser head 25 and an audio control head 26 and finally passed through a gap between a capstan 4 and a pinch roller 5.

The capstan 4 is drivingly coupled with a drive motor 23 which is in turn electrically connected with a tape transport means 18. Although not shown, the tape transport means 18 comprises a drive circuit and a servo control mechanism and is operable to drive the capstan drive motor 23 through the servo control mechanism so as to transport the magnetic recording tape 1 at a predetermined speed from the supply reel 2 towards the take-up reel 3. This tape transport means 18 is electrically connected with a recording timer 17 adapted to be preset with a recording time during which information recording on the magnetic recording tape 1 is desired to be made and operable to cause a recording time display unit 16 to display the balance of the preset recording time less the length of time actually spent in the information recording and also to generate a stop signal to the tape transport means 18 to terminate the tape transport when the balance of the preset recording time less the length of time actually spent in the information recording becomes zero, that is, when the length of time corresponding to the preset recording time has been passed.

The tape transport means 18 is also connected with a tape transport speed selecting means 19 including a tape transport speed selecting switch 20 capable of assuming one of at least two positions, for example, SP (Standard Play mode during which the magnetic recording tape is transported at a first or standard speed) and EP (Extended Play mode during which the length of magnetic recording tape 1 is transported at a second or extended speed which is 1/n of the standard speed, n being arbitrarily chosen integer, for example, 2 or 3) mode positions. The tape transport speed selecting means 19 is so designed as to generate an SP mode signal to the tape transport means 18 to cause the magnetic recording tape 1 to be transported at the standard speed from the supply reel 2 onto the take-up reel 3 when the tape speed selecting switch 20 is set in the SP mode position, and to generate an EP mode signal to the tape transport means 18 to cause the magnetic recording tape 1 to be transported at the extended speed from the supply reel 2 onto the take-up reel 3 when the tape transport speed selecting switch 20 is set in the EP mode position.

FIG. 4 illustrates a system for calculating the length of magnetic recording tape 1 remaining on the supply reel 2 (which length is hereinafter referred to as the remaining tape length) and the length of time corresponding to the length of magnetic recording tape remaining on the supply reel 2, which system is employed in the prior art magnetic tape player employing the tape transport speed selector mechanism shown in and described with reference to FIG. 3. This system is found in, for example, the Japanese Patent Publication Examined No. 55-34514, published Sept. 6, 1980, and U.S. Pat. No. 3,834,648, issued Sept. 10, 1974.

In FIG. 4, reference numeral 7 represents a tape motion measuring mechanism for calculating the amount of movement of the magnetic recording tape 1 in a direction longitudinally thereof; reference numeral 8 represents a calculating circuitry operable in response to an signal from the tape motion measuring mechanism 7, which signal is indicative of the amount of movement of the magnetic recording tape 1, to calculate, and generate an output signal indicative of, the remaining tape length or the length of time corresponding to the remaining tape length (which length of time is hereinafter referred to as the remaining tape hour); and reference numeral 15 represents a tape hour display unit for displaying the remaining tape hour.

With reference to FIG. 4, the method of calculating and displaying the remaining tape hour, that is, the length of time corresponding to the remaining tape length on the supply reel 2, will be discussed in detail as it pertains to the present invention.

The tape motion measuring mechanism 7 comprises a reel revolution detecting means or reel tachometer 11 for providing a signal R per revolution of the supply reel 2; a tape length detecting means 9 drivingly coupled with a drive system for the capstan 4 for providing a signal P each time a predetermined length of the magnetic recording tape 1 is moved in a direction longitudinally thereof; and a tape motion detecting means 10 operable to count the number of signals P, outputted from the tape length detecting means 9, in reference to the signal R outputted from the reel tachometer 11 and for subsequently outputting a tape length signal l representative of the length of the magnetic recording tape having been moved per revolution of the supply reel 2. The reel revolution detecting means or reel tachometer 11 may comprise a photodetector system including a light emitting element or photodiode and a light reflecting or intercepting plate secured to a drive system for the supply reel 2 and designed to generate the signal R each time the supply reel 2 undergoes a complete revolution.

The calculating circuitry 8 is connected with the tape motion measuring mechanism 7 so as to receive the tape length signal l and is operable to determine the remaining tape length Ls, then to calculate the remaining tape hour Ts on the basis of the remaining tape length Ls and to output a remaining tape hour signal, representative of the calculated remaining tape hour, which is subsequently applied to a remaining tape hour display unit 15 for the display of the remaining tape hour Ts. This calculating circuitry 8 is comprised of a squaring circuit 12, a subtracting circuit 13 and dividing circuit 14.

The calculating circuitry 8 performs the following calculations.

The remaining tape length Ls, that is, the entire length of the magnetic recording tape 1 remaining on the supply reel 2, can be expressed by the following equation.

$$Ls = \pi(rs^2 - rh^2)/d \tag{1}$$

where rs represents the radius of the tape pack on the supply reel 2 including the radius rh of the reel hub of the supply reel 2 as shown in FIG. 3 and d represents the thickness of the magnetic recording tape 1.

Assuming that the length of the magnetic recording tape 1 moved in the longitudinal direction thereof per revolution of the supply reel 2 is expressed by l, the parameter rs, that is, the sum of the radii of the tape pack and the reel hub, can be expressed as follow.

$$rs = l/2\pi \tag{2}$$

Rewriting the equation (1) with the use of the equation (2) results in:

$$\begin{aligned} Ls &= [\pi(l^2/4\pi^2 - rh^2)]/d \\ &= (l^2 - 4\pi^2 \cdot rh^2)/4\pi d \end{aligned} \tag{3}$$

Since the thickness d of the magnetic recording tape 1 and the radius rh of the reel hub of the supply reel 2 are known parameters, the remaining tape length Ls can be determined if the length l of magnetic recording tape 1 moved per revolution of the supply reel 2 is determined.

Also, if the standard tape transport speed is expressed by V, the remaining tape hour Ts, that is, the length of time corresponding to the remaining tape length Ls (or the length of time over which information recording or playback can be available on the remaining tape length Ls) can be determined from the following equation.

$$Ts = Ls/V \tag{4}$$

In view of the foregoing, the squaring circuit 12 of the calculating circuitry 8 is operable to determine the square of the length l of the magnetic recording tape 1 moved per revolution of the supply reel 2. The subtracting circuit 13 is operable to subtract ($4\pi^2 \cdot rh^2$) from the squared value $l^2$, and the dividing circuit 14 is operable to divide ($l^2 - 4\pi^2 \cdot rh^2$) by $4\pi dV$ to give the remaining tape hour Ts.

In the conventional magnetic tape player of the above described construction including the tape transport speed selector means 19 and the tape motion measuring mechanism 7, if the operator or user of the magnetic tape player wishes to change the tape transport speed during an information recording, he or she has to read the remaining tape hour Ts, indicated by the remaining tape hour display unit 15, and the balance of the preset recording time less the length of time actually spent in the information recording, indicated by the recording time display unit 16, and then manipulates the tape transport speed selecting switch. More specifically, assuming that the information recording is taking place with the tape transport speed set at the standard speed, that is, assuming that the information recording is taking place with the magnetic tape player set in the SP mode, and in the event that the reading of both of the remaining tape hour display unit 15 and the recording time display unit 16 shows that the remaining tape hour Ts is smaller than the balance of the preset recording time less the length of time actually spent in the information recording, the operator has to manipulate the tape transport speed selecting switch 20 to set the magnetic tape player in the EP mode, that is, to cause the magnetic recording tape 1 to be transported at the extended speed. On the other hand, in the event that, during the EP mode in which the magnetic recording tape 1 is transported at the extended speed, the value equal to a multiple of the remaining tape hour Ts coincides with the balance of the preset recording time less the length of the time actually spend in the information recording as indicated by the display unit 16, the manipulation of the tape transport speed selecting switch 20 may result in that the information recording to the end of the magnetic recording tape 1 can terminate simultaneously with the zeroing of the preset recording time, thereby preventing a number of turns of the magnetic recording tape from being left on the supply reel which may be short of a length required to record the future program and, hence, may be unusable turns of the magnetic recording tape on the supply reel.

With the conventional magnetic tape player, when an attempt is made to maximize the utilization of the unrecorded portion of the magnetic recording tape in such a way as to avoid the unusable turns of the magnetic recording tape on the supply reel about the end of the magnetic recording tape or to avoid the possibility that the end of the magnetic recording tape is approached during the course of information recording taking place thereby leaving a portion of the information unrecorded, the operator of the magnetic tape player has to read the respective displays on the separate display units and perform and mentally compare the remaining tape hour with the balance between the preset recording time and the length of time actually spent in information recording to determine the necessity of the manipulation of the tape transport speed selecting switch. Accordingly, inconvenience has been often experienced with the conventional magnetic tape player that the operator cannot leave the area where the magnetic tape player is installed.

SUMMARY OF THE INVENTION

The present invention has been accordingly developed with a view to substantially eliminating the above discussed inconveniences experienced with the conventional magnetic tape players and is intended to provide an improved magnetic tape player wherein the change in tape transport speed can be automatically performed to enable the recording of a predetermined amount of information to terminate simultaneously with the detection of an approach to the end of the magnetic recording tape on the supply reel.

To this end, the present invention provides a magnetic tape recording and/or reproducing apparatus which comprises a tape transport means for transporting a magnetic recording tape in a direction longitudinally thereof, a tape transport speed selecting means for controlling the tape transport means and capable of assuming one of first and second modes during which the magnetic recording tape is transported at first and second transport speeds, respectively, said second transport speed being 1/n of the first transport speed, wherein n is an integer other than 1, a remaining tape length measuring means for measuring a length of time available for recording information to an end of the magnetic recording tape when the magnetic recording tape is transported at the first transport speed and for outputting an available recording time signal indicative of said length of time available for recording, a recording timer means for outputting a remaining time signal indicative of the balance between a preset recording time and the length of time actually spent in recording and for outputting a terminating signal to the tape transport means to terminate the transport of the magnetic recording tape when said balance becomes zero, and a comparing means for comparing the available recording time signal and the remaining time signal with a conversion value during information recording with the magnetic recording tape transported at the second transport speed.

According to the present invention, where the result of the comparison performed by the comparing means indicates that the available recording time signal outputted from the remaining tape length measuring means is higher than the remaining time signal outputted from the recording timer means, the tape transport speed selecting means is set in the first mode to cause the magnetic recording tape to be transported at the first transport speed, but where the result of the comparison by the comparing means indicates that the available recording time signal is lower than the remaining time signal, the tape transport means is set in the second mode to cause the magnetic recording tape to be transported at the second transport speed.

Furthermore, according to the present invention, the available recording time represented by the output signal from the remaining tape length measuring means is converted into the remaining tape length which would be indicated during the information recording with the magnetic recording tape transported at the second transport speed that is 1/n of the first transport speed. The remaining tape length so converted from the available recording time is subsequently compared with the remaining time represented by the output signal from the recording timer means so that, if the available recording time signal outputted from the remaining tape length measuring means is found higher than the remaining time signal outputted from the recording timer means, the tape transport speed selecting means can be set in the first mode to cause the magnetic recording tape to be transported at the first transport speed, but if the available recording time signal is lower than the remaining time signal, the tape transport means can be set in the second mode to cause the magnetic recording tape to be transported at the second transport speed.

In the practice of the present invention, the remaining tape length is measured during information recording, and the measured remaining tape length is converted into the remaining tape length which would be indicated when the magnetic recording tape is transported at the second transport speed during the EP mode of operation of the magnetic tape player. The converted remaining tape length is then compared with the balance between the preset recording time and the length of time actually spent in recording, which balance is represented by the output signal from the recording timer means. Based on the result of the comparison performed by the comparing means, the tape transport speed can be automatically changed so that the information recording can terminate substantially simultaneously with the approach to the end of the magnetic recording tape on the supply reel.

With the magnetic tape player so constructed as hereinabove described according to the present invention, the use of the magnetic recording tape having been recorded in part can be advantageously maximized in such a way as to avoid the possibility that the end of the magnetic recording tape is approached in the course of the information recording taking place to thereby fail to completely record the whole of the information or to avoid the possibility that a relatively greater number of turns of the magnetic recording tape are left on the supply reel, thereby constituting a cause of waste of the magnetic recording tape. It is eventually pointed out that, with the system of the present invention, the tape transport speed can be automatically changed to permit the entire length of information to be recorded on the magnetic recording tape if it is determined that the recording with the magnetic recording tape being transported at the standard tape transport speed cannot accommodate the whole of the information, and therefore, without the operator of the magnetic tape player needed to be attendant to the magnetic tape player such as occasioned when the recording is desired to be made while the operator is out of the house, the magnetic tape player embodying the present invention can automatically change the tape transport speed to the extended tape transport speed to permit the entire length of information to be successfully recorded on the magnetic recording tape.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the accompanying drawings, like reference numerals are used to denote like parts throughout the several views, and:

DETAILED DESCRIPTION OF THE EMBODIMENT

Figure 1:
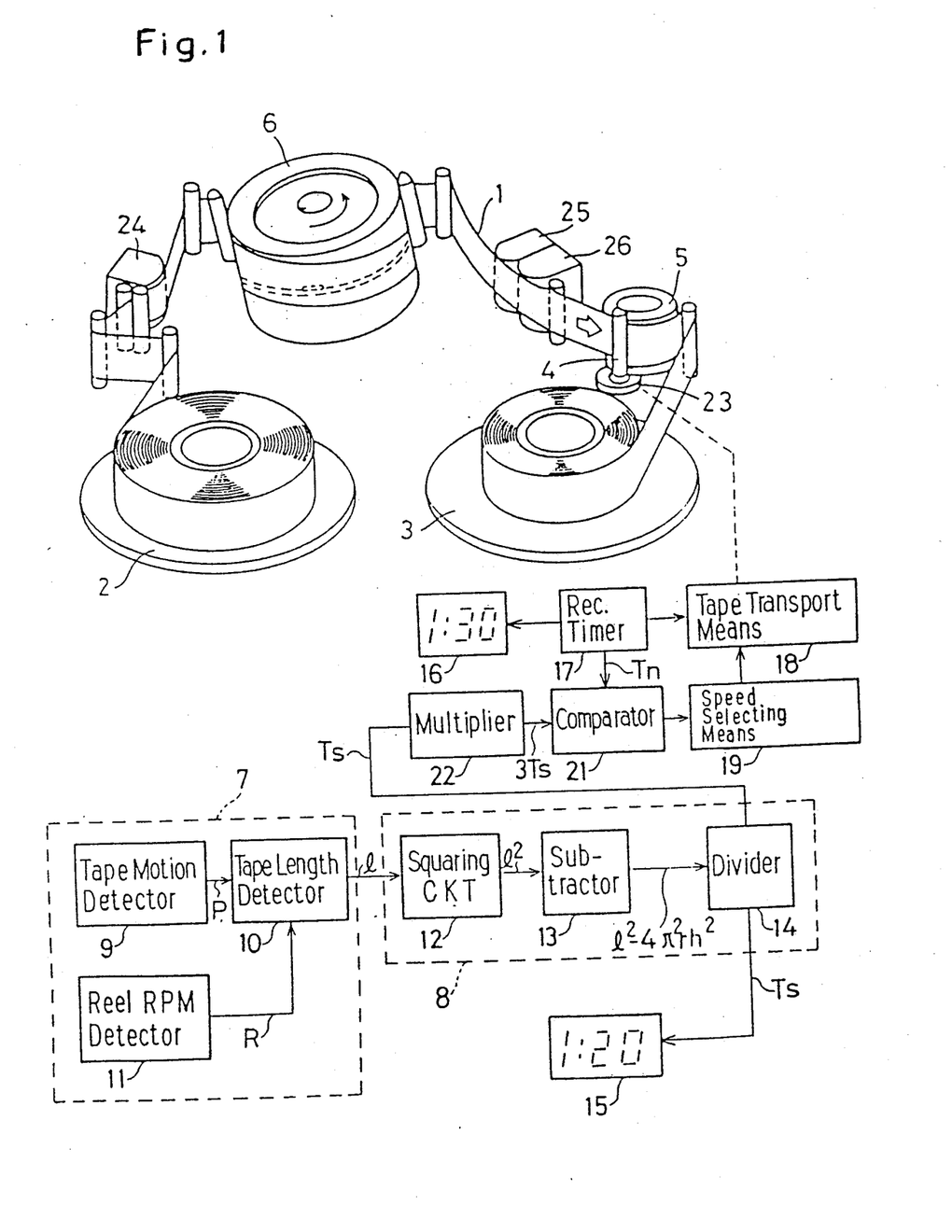
FIG. 1 is a schematic diagram illustrating both a magnetic tape player in schematic perspective representation and a circuit block diagram used in the magnetic tape player.

As can readily understood from the comparison of FIG. 1 with FIGS. 3 and 4, the system shown in FIG. 1 in accordance with the present invention is generally similar to that shown in FIGS. 3 and 4 except that, in the system of FIG. 1, the dividing circuit 14 is electrically connected with the tape transport speed selecting means 19 through a multiplying circuit 22 and a comparing circuit 21.

The multiplying circuit 22 is operable to multiply the output value from the calculating circuitry 8, that is, the remaining tape hour Ts by a reciprocal of the ratio of the extended tape transport speed relative to the standard tape transport speed. More specifically, where the extended tape transport speed is chosen to be ⅓ of the standard tape transport speed, the multiplying circuit 22 is operable to multiply the remaining tape hour Ts by 3. The comparing means 21 receiving as a first input an output signal from the multiplying circuit 22 and as a second input an output signal from the recording timer means 17 is operable to compare the product of the remaining tape hour Ts times 3, which product is hereinafter referred to as the extended remaining tape hour 3·Ts, with the output from the recording timer means 17, that is, the remaining time Tn (the balance between the preset recording time, set in the recording timer means 17, and the length of time actually spent in recording).

Should the comparing circuit 21 indicate that the extended remaining tape hour 3·Ts is longer than the remaining time Tn, the comparing circuit 21 applies to the tape transport speed selecting means 19 a first command necessary to cause the tape transport speed selecting means 19 to drive the tape transport means 18 so as to transport the magnetic recording tape 1 at the standard tape transport speed. But should the comparing circuit 21 indicate that the extended remaining tape hour 3·Ts is shorter than the remaining time Tn, the comparing circuit 21 applies to the tape transport speed selecting means 19 a second command necessary to cause the tape transport speed selecting means 19 to drive the tape transport means 18 so as to transport the magnetic recording tape 1 at the extended tape transport speed.

The operation of the system shown in FIG. 1 will now be described with particular reference to the flowchart shown in FIG. 2. In describing the operation, it is assumed that the extended tape transport speed at which the magnetic recording tape 1 is transported in the direction longitudinally thereof from the supply reel 2 onto the take-up reel 3 during the EP mode of operation of the magnetic tape player is ⅓ of the standard tape transport speed at which the magnetic recording tape 1 is transported during the SP mode of operation of the magnetic tape player.

Figure 2:
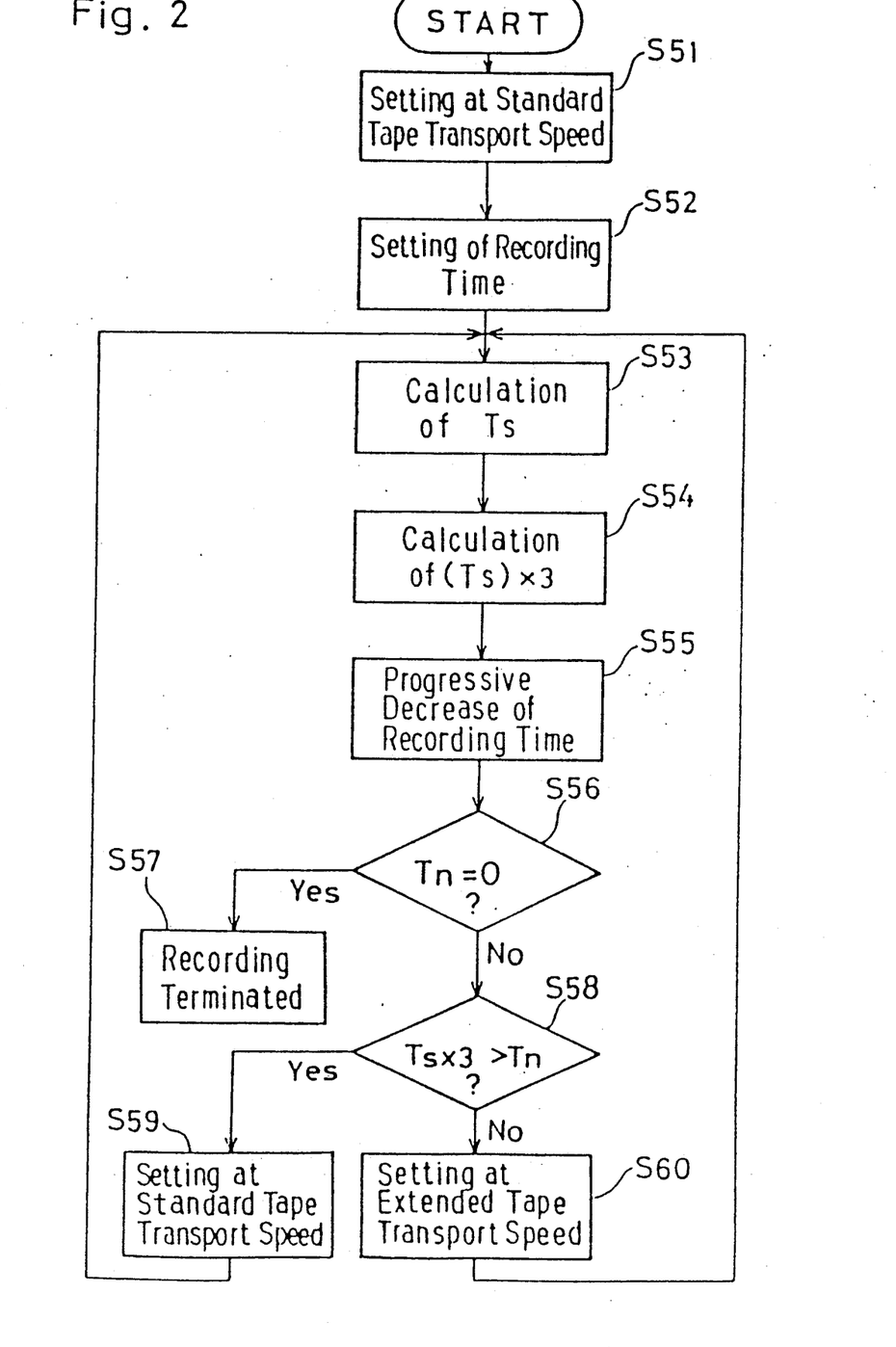
FIG. 2 is a flowchart used to explain the operation of the system according to the present invention.

Referring now to FIG. 2, subsequent to the magnetic tape player starting a recording operation, the tape transport means 18 is set to the standard tape transport speed as step S51, followed by the setting in the recording timer means 17 at step S52 a recording time over which the operator of the magnetic tape player wishes to make a recording on the magnetic recording tape 1. This recording time set in the recording timer means 17 is herein referred to as the preset recording time. As the recording operation progresses, the remaining tape hour Ts is measured at step S53, which hour Ts is subsequently multiplied by 3 at step S54 to give the extended remaining tape hour 3·Ts.

Simultaneously with the progress of the recording operation, the preset recording time set in the recording timer means 17 is progressively decreased at step S55. At subsequent step S56, a decision is made to determine if the remaining time Tn which represents the balance between the preset recording time and the length of time actually passed subsequent to the start of the recording operation becomes zero. If the result of the decision at step S56 indicates "Yes", that is, that the remaining time Tn is zero, a terminating command is issued to the tape transport means 18 to terminate the recording operation at step S57.

On the other hand, if the result of the decision at step S56 indicates "No", that is, that the remaining time Tn has not yet become zero, and, hence, during a period up until the remaining time Tn becomes zero, the extended remaining tape hour 3·Ts calculated at step S54 is compared with the remaining time Tn at step S58 to determine if the extended remaining tape hour 3·Ts is longer than the remaining time Tn.

If the extended remaining tape hour 3·Ts is longer than the remaining time Tn as determined at step S58, the recording operation continues with the magnetic recording tape 1 being transported at the standard tape transport speed at step S59. However, if the extended remaining tape hour 3·Ts is shorter than the remaining time Tn, the command necessary to change the tape transport speed to the extended tape transport speed is applied to the tape transport speed selecting means 19 to cause the tape transport means 18 to transport the magnetic recording tape 1 at the extended tape transport speed at step S60 with the magnetic tape player consequently set under the EP mode.

As hereinabove described, while the recording operation is taking place, the tape transport speed can be automatically changed from the standard tape transport speed to the extended tape transport speed so that the available recording time can coincide with the remaining time indicated by the recording timer means 17 to permit the recording time Tn to become zero substantially simultaneously with the approach to the end of the magnetic recording tape 1 on the supply reel 2.

Thus, according to the present invention, the use of the magnetic recording tape having been recorded in part can be advantageously maximized in such a way as to accommodate in the remaining non-recorded portion thereof a certain amount of information which would not be completely recorded on the magnetic recording tape if the latter is during the recording operation transported at the standard tape transport speed. Therefore, without the operator of the magnetic tape player attendant to the magnetic tape player such as occasioned when the recording is desired to be made while the operator is not of the house, the magnetic tape player embodying the present invention can automatically change the tape transport speed, if it is determined that the recording with the magnetic recording tape being transported at the standard tape transport speed cannot accommodate the whole of the information, to the extended tape transport speed to permit the whole of the information to be successfully recorded on the magnetic recording tape.

It is to be noted that the software flowchart shown in an described with reference to FIG. 2 can be implemented in a hardware environment such as by the use of a microcomputer so programmed as to execute the flowchart.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, the recording timer means 17 may comprise a clock means capable of indicating the current clock time of the day, a time memory means for storing the clock time at which the recording operation is desired to be terminated, and a subtracting means for subtracting the current clock time, indicated by the clock means, from the clock time stored in the time memory means so that, when the difference given by the subtracting means becomes zero, the terminating command can be issued to the tape transport means 18 to terminate the transport of the magnetic recording tape at step S57.

Also, in the foregoing embodiment of the present invention, the remaining tape hour Ts has been described as multiplied by n which is an integer not smaller than 2 before it is compared with the remaining time Tn. However, the system can operate effectively even if the remaining time Tn is multiplied by 1/n, that is, divided by n, and the value Tn/n is subsequently compared with the remaining tape hour Ts.

In addition, in the foregoing embodiment of the present invention, as the tape motion measuring mechanism 7, arrangement has been made to detect the length l of the magnetic recording tape 1 moved per revolution of the supply reel 2 and then to calculate both of the remaining tape length Ls and the remaining tape hour Ts on the basis of the detected length l of the magnetic recording tape 1 moved per revolution of the supply reel 2. However, any known technique may instead be employed to detect the speed at which the magnetic recording tape 1 is moved and then to calculate both of the remaining tape length Ls and the remaining tape hour Ts on the basis of the detected tape speed.

Accordingly, such changes and modifications are, unless they depart from the spirit and scope of the present invention as delivered from the claims annexed hereto, to be construed as included therein.

What is claimed is:

1. A magnetic tape recording/reproducing apparatus comprising:
    tape transport means for transporting a magnetic recording tape in a longitudinal direction across a magnetic head;
    tape transport speed selecting means, for controlling said tape transport means, assuming one of standard and extended modes during which said magnetic recording tape is transported at respective first and second transport speeds, said second transport speed being 1/n of said first transport speed, wherein n is an integer other than 1;
    remaining tape length measuring means for measuring a length of time available for recording information on an unrecorded portion at the end of said magnetic recording tape if said magnetic recording tape was being transported at said second transport speed of said extended mode and for outputting an available recording time signal indicative of said length of time available for recording;
    recording timer means for outputting a remaining time signal indicative of the balance between a preset recording time and a length of time actually passed during information recording and for outputting a terminating signal to said tape transport means to terminate the transport of said magnetic recording tape when said balance becomes zero; and
    comparing means for comparing said available recording time signal and said remaining time signal during information recording while said magnetic recording tape is transported at said first transport speed whereby
        if the value of said available recording time signal is greater than the value of said remaining time signal, said tape transport speed selecting means is set in said standard mode to direct said magnetic recording tape to be transported at said first transport speed, and
        if the value of said available recording time signal is less than the value of said remaining time signal, said tape transport speed selecting means is set in said extended mode to direct said magnetic recording tape to be transported at said second transport speed.

2. The magnetic tape recording/reproducing apparatus as claimed in claim 1, said remaining tape length measuring means comprising a multiplier for multiplying a standard mode available recording time signal by n to generate said available recording time signal.

3. The magnetic tape recording/reproducing apparatus as claimed in claim 1, said recording timer means is operable to subtract said length of time actually passed during information recording from said preset recording time set in said recording timer means to thereby provide said remaining time signal.

4. The magnetic tape recording/reproducing apparatus as claimed in claim 1, said recording timer means is operable to subtract a current clock time from an expected clock time at which information recording is desired to be terminated, and to thereafter provide said remaining time signal.

5. The magnetic tape recording/reproducing apparatus as claimed in claim 1, said remaining tape length measuring means comprising:

tape motion measuring means for calculating the length of said magnetic recording tape which has been moved per revolution of a supply reel according to a predetermined equation using a detected value representative of the number of revolutions of the supply reel and a detected value representative of the length of said magnetic recording tape actually moved; and time calculating means for determining an available recording time during which said magnetic recording tape transported at said first transport speed can be recorded to the end of said magnetic recording tape on the supply reel, according to a predetermined equation using an output value from said tape motion measuring means.

6. An automatic tape transport speed switching method for switching a tape recording/reproducing apparatus between that of a standard operational mode or an extended operational mode so that desired information is recorded entirely on remaining unrecorded tape comprising the steps of:

setting the tape recording/reproducing apparatus to the standard operational mode;

setting a recording timer to a recording time indicative of a length of time required to record a desired information;

progressively decreasing said recording time in said recording timer as said desired information is recorded;

calculating continuously in calculating means a remaining tape hour time indicative of the amount of remaining unrecorded tape available for recording if the tape recording/reproducing apparatus was being operated in the extended operational mode; and determining in a comparison means when said remaining tape hour time is less than said recording time to generate a tape mode signal which sets the tape recording/reproducing apparatus to the extended operational mode so that no unrecorded tape remains on the tape means after completion of recording of the desired information.

7. The automatic tape transport speed switching method of claim 6, the tape recording/reproducing apparatus being operable at a first speed during said standard operational mode and being operable at a second speed during said extended operational mode which is 1/n of said first speed, wherein n is a non-zero integer greater than one.

8. The automatic tape transport speed switching method of claim 7, said step of calculating comprising the step of multiplying a standard operational mode remaining tape hour time by n prior to said determining step to generate the remaining tape hour time.

9. The automatic tape transport speed switching method of claim 6, further comprising the step of terminating said recording of the desired information if said recording time becomes equal to zero.

10. A tape recording/reproducing apparatus with automatic tape transport speed control comprising:

tape transport means for transporting the tape across a magnetic head at a first speed during a first operational mode and at a second speed during a second operational mode;

recording timer means, operable to be set to a recording time indicative of a length of time required to record a desired information, for continuously displaying a current recording time during recording and for generating a current recording time signal indicative thereof;

calculating means for continuously calculating and displaying a remaining tape hour time indicative of the amount of remaining unrecorded tape available for recording if the tape recording/reproducing apparatus was being operated in said second operational mode and for generating a remaining tape hour signal indicative thereof; and control means, coupled to said recording timer means and said calculating means, for comparing said current recording time signal and said remaining tape hour signal to generate a switching signal to direct operation of said tape transport means in said first or second operational modes, said tape transport means being initially set for operation in said first operational mode and thereafter being set to said second operational mode, under control of said switching signal, when said control means determines that said remaining tape hour time is less than said current recording time.

11. The tape recording/reproducing apparatus of claim 10, said second speed being 1/n of said first speed, wherein n is a non-zero integer greater than one.

12. The tape recording/reproducing apparatus of claim 11, said calculating means comprising a multiplier for multiplying a first operational mode remaining tape hour signal by n to generate said remaining tape hour signal.

13. The tape recording/reproducing apparatus of claim 10, said recording timer means operable to generate and output a recording termination signal to said tape transport means to direct termination of recording when said current recording time reaches zero.

14. A tape transport speed control apparatus for controlling tape speed of a tape recording/reproducing apparatus so that no unrecorded tape remains on tape means after completion of recording of desired information, the tape recording/reproducing apparatus operable at a first speed during a first operational mode and at a second speed during a second operational mode, comprising:

recording timer means, coupled to tape transfer means and operable to be set to a recording time indicative of a length of time required to record the desired information, for continuously displaying a current remaining recording time during recording and for generating a current recording time signal indicative thereof;

calculating means, coupled to a tape position sensor and a reel RPM sensor, for calculating and displaying a remaining tape hour time indicative of the amount of remaining unrecorded tape available for recording if the tape recording/reproducing apparatus was being operated in the second operational mode and for generating a remaining tape hour signal indicative thereof; and control means, coupled to said recording timer means and said calculating means, for comparing said current recording time signal and said remaining tape hour signal to generate a switching signal to direct operation of said tape transport means of the tape recording/reproducing apparatus in the first or second operational modes, said control means initially generates said switching signal to direct operation of said tape transport means at the first operational mode and thereafter at the second operational mode when it is determined that said remaining tape hour time is less than said current remaining recording time.

15. The tape transport speed control apparatus of claim 14, said second speed being 1/n of said first speed, wherein n is a non-zero integer greater than one.

16. The tape transport speed control apparatus of claim 15, said calculating means comprising a multiplier for multiplying a first operational mode remaining tape hour signal by n to generate said remaining tape hour signal.

17. The tape transport speed control apparatus of claim 14, said recording timer means operable to generate and output a recording termination signal to direct termination of recording when said current recording time reaches zero.

18. An automatic tape transport speed switching method for switching a tape recording/reproducing apparatus between that of a standard operational mode operable at a first speed or an extended operational mode operable at a second speed so that desired information is recorded entirely on remaining unrecorded tape, the second speed being 1/n of the first speed wherein n is a non-zero integer greater than one, comprising the steps of:
  setting the tape recording/reproducing apparatus to the standard operational mode;
  setting a recording timer to a recording time indicative of a length of time required to record a desired information;
  progressively decreasing said recording time in said recording timer as said desired information is recorded;
  dividing said recording time by n in a divider;
  calculating continuously in calculating means a remaining tape hour time indicative of the amount of remaining unrecorded tape available for recording if the tape recording/reproducing apparatus was being operated in the standard operational mode; and
  determining in a comparison means when said remaining tape hour time is less than said divided recording time to generate a tape mode signal which sets the tape recording/reproducing apparatus to the extended operational mode so that no unrecorded tape remains on the tape means after completion of recording of the desired information.

19. A tape recording/reproducing apparatus with automatic tape transport speed control comprising:
  tape transport means for transporting the tape across a magnetic head at a first speed during a first operational mode and at a second speed during a second operational mode, said second speed being 1/n of said first speed when n is a non-zero integer greater than one;
  recording timer means, operable to be set to a recording time indicative of a length of time required to record a desired information, for continuously displaying a current remaining recording time during recording, for generating a current recording time signal indicative thereof and for dividing said current recording time signal by n;
  calculating means for continuously calculating and displaying a remaining tape hour time indicative of the amount of remaining unrecorded tape available for recording if the tape recording/reproducing apparatus was being operated in said first operational mode and for generating a remaining tape hour signal indicative thereof; and
  control means, coupled to said recording timer means and said calculating means, for comparing said divided recording time signal and said remaining tape hour signal to generate a switching signal to direct operation of said tape transport means in said first or second operational modes,
  said tape transport means being initially set for operation in said first operational mode and thereafter being set to said second operational mode, under control of said switching signal, when said control means determines that said remaining tape hour time is less than said current recording time.

* * * * *